(12) United States Patent
Beucher et al.

(10) Patent No.: US 8,385,603 B2
(45) Date of Patent: Feb. 26, 2013

(54) METHOD FOR HIERARCHICAL DETERMINATION OF COHERENT EVENTS IN A SEISMIC IMAGE

(75) Inventors: Serge Beucher, Urly (FR); Etienne Decenciere, Avon (FR); Luc Sandjivy, Avon (FR); Cedric Magneron, Fontainebleau (FR); Timothee Faucon, Avon (FR)

(73) Assignee: Earth Resources Management Services (ERMS), Fontainebleau (FR)

( * ) Notice: Subject to any disclaimer, the term of this patent is extended or adjusted under 35 U.S.C. 154(b) by 1318 days.

(21) Appl. No.: 11/911,642

(22) PCT Filed: Apr. 18, 2006

(86) PCT No.: PCT/FR2006/000865
§ 371 (c)(1),
(2), (4) Date: Oct. 15, 2007

(87) PCT Pub. No.: WO2006/108971
PCT Pub. Date: Oct. 19, 2006

(65) Prior Publication Data
US 2008/0170756 A1      Jul. 17, 2008

(30) Foreign Application Priority Data
Apr. 15, 2005   (FR) ...................................... 05 03793

(51) Int. Cl.
*G06K 9/46* (2006.01)
*G06K 9/00* (2006.01)
(52) U.S. Cl. ........................................ 382/109; 382/181
(58) Field of Classification Search .................. 382/109, 382/113, 164, 172, 173, 178, 181, 199, 203, 382/305, 308; 702/5, 6, 14, 16, 17, 179; 703/5, 6, 10; 706/12, 14, 48; 367/53
See application file for complete search history.

(56) References Cited

U.S. PATENT DOCUMENTS

| | | | |
|---|---|---|---|
| 7,079,953 B2 * | 7/2006 | Thorne et al. ................... | 702/16 |
| 7,162,463 B1 * | 1/2007 | Wentland et al. ............... | 706/48 |
| 7,308,139 B2 * | 12/2007 | Wentland et al. ............. | 382/181 |
| 7,630,517 B2 * | 12/2009 | Mirowski et al. ............. | 382/109 |
| 7,706,981 B2 * | 4/2010 | Wilkinson et al. .............. | 702/14 |
| 2003/0204311 A1 | 10/2003 | Bush | |
| 2005/0171700 A1 * | 8/2005 | Dean ............................... | 702/16 |

(Continued)

OTHER PUBLICATIONS

Kimura A, et al. "Parallel volume segmentation with tethahedral adaptive grid" Pattern Recognition, 2004. Piscataway, NJ, US. vol. 2, pp. 281-286.

(Continued)

*Primary Examiner* — Amir Alavi
(74) *Attorney, Agent, or Firm* — Browdy and Neimark, PLLC

(57) ABSTRACT

The determination of coherent events in a seismic image is disclosed including the following operational phases: a phase of selecting a segmentation criterion based on a variable and at least one sliding window on the zone and its characteristics, a phase of hierarchical segmentation, for overlapping positions of the sliding window, including a segmentation of the zone into n regions and for each pixel located at least once by a segmentation boundary; a phase of assigning to the non-located pixels a value of indices (EI and EIC) corresponding to a numerical or alphanumeric characteristic non-value; a phase of determining coherent events of the image by thresholding the indices (EI and EIC), that is by selecting only located pixels of the zone corresponding to values lower or higher than a fixed threshold.

10 Claims, 7 Drawing Sheets

U.S. PATENT DOCUMENTS

2005/0288863 A1* 12/2005 Workman .................. 702/14
2008/0170756 A1*  7/2008 Beucher et al. .............. 382/109
2008/0208828 A1*  8/2008 Boiman et al. ............... 707/4
2010/0149917 A1*  6/2010 Imhof et al. ................. 367/53
2010/0274543 A1* 10/2010 Walker et al. ............... 703/6

OTHER PUBLICATIONS

Najman L, et al. "Geodesic Saliency of Watershed Cnotours and Hierarchical Segmention" IEEE Transactions on Pattern Analysis and Machine Intelligence, Los Angeles, CA, US, 1996. vol. 18. No. 12, pp. 1163-1173.

Zhen Zhang, et al. "A Knowledge-Based System Controlled by an Iterative Quadtree Splitting Scheme for Segmentation of Seismic Sections" IEEE Transactions on Geoscience and Remote Sensing, Piscataway, NJ, US, 1988. vol. 26, No. 5, pp. 518-524.

Dorn Ga "Modern 3-D Seismic Interpretation" Exploration Leading Edge, The, Tulsa, OK, US, 1998. vol. 17, No. 9, pp. 1262-1264.

International Search Report PCT/FR2006/000865, 2006.

* cited by examiner

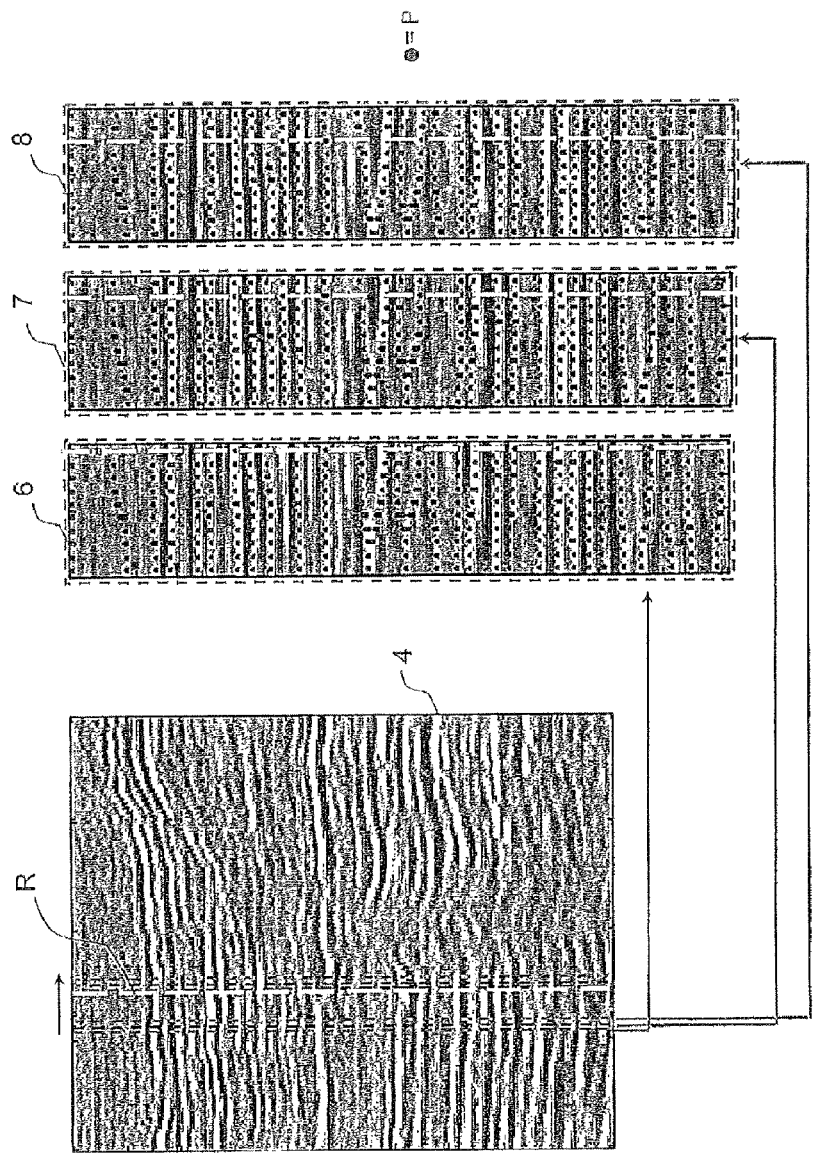

METHOD FOR HIERARCHICAL DETERMINATION OF COHERENT EVENTS IN A SEISMIC IMAGE

This application is a 371 of PCT/FR2006/000865 filed on Apr. 18, 2006

BACKGROUND OF THE INVENTION

1. Field of the Invention

The present invention relates to a method for the hierarchical determination of coherent events in a seismic image.

It applies more specifically, but not exclusively, to the imaging data obtained by means of physical seismic imaging methods: seismic amplitude or attribute data, in the pre-stack and post-stack fields, the stack being a central seismic processing operation making it possible to compress the seismic data (reduction of number of data items) and acts like a powerful anti-noise filter. It is also applicable to medical, sonar, non-destructive material testing imaging data, etc.

2. Description of the Prior Art

Mathematical Morphology, developed for the same purpose as Geostatistics by Professor Georges Matheron, is based on Cartesian and topological concepts. Its principle consists in studying the morphological characteristics (shape, size, orientation, etc.) of the objects in an image. Mathematical Morphology provides the suitable language and non-linear tools for the recognition and processing of shapes in an image irrespective of its dimension (1D, 2D, 3D . . . nD).

More specifically, Mathematical Morphology provides hierarchical image segmentation tools. In fact, it enables the segmentation of images into several regions according to one or more criteria such as the amplitude, contrast, amplitude gradient, etc. The boundaries between the regions define not necessarily rectilinear segments which generally represent energetic and continuous shapes of the image.

By definition, the term "coherent event" in a 3D image will refer to a coherent surface according to continuity and energy criteria. For a 2D image, a coherent event will correspond to a not necessarily straight line.

The usual methods to determine coherent events in seismic images are generally based on so-called propagation algorithms. Seeds are positioned on the image, i.e. anchoring points on the coherent events to be determined. These seeds are generally the result, of a human interpretation. The propagation algorithms determine the entirety of each of the coherent events selected by searching in the image the paths with the greatest correlation on the basis of the seeds relating to each event. They "propagate" from point to point, pixel by pixel, the coherent events of the image. This type of algorithm may prove to be unstable, particularly in a noisy environment, and an "incorrect" path of greatest spatial correlation is sometimes quickly taken. In addition, this propagation approach is not optimal for a 3D and real-time volume interpretation of the coherent events present in seismic cubes.

A direct application of the invention relates to the quality control of a horizon pointer (coherent events corresponding to geological interfaces) on a seismic cube.

The pointer of coherent events referred to as horizons on seismic cubes is produced semi-automatically. An interpreter creates seeds which are used an anchoring points for a propagation algorithm intended to generate all or part of the "pointed" horizon. However, this type of algorithm may prove to be unstable, particularly in a noisy environment. This instability is conveyed by shifts in the pointer with respect to the local extremum corresponding to the targeted seismic event, or sometimes by more radical errors corresponding to phase jumps. These errors may have a very significant impact on the value of the amplitude or of any other attribute extracted for example within the scope of a "reservoir-oriented study". However, reliable and quick quality control of the pointer of these horizons proves to be essential. In fact, a "reservoir-oriented study" is a reservoir imaging study, estimating the reserves contained and, as the economic implications of such studies are considerable, the accuracy of the results provided must be optimal. Minor errors may have major economic consequences.

Moreover, visual examination is unsuitable for rapidly detecting spatial anomalies extending in the three spatial dimensions.

Another possible application relates to the determination of coherent events on different seismic cubes of the same geographic zone, these cubes being generated with different processing parameters.

In the solutions presently proposed, it happens frequently in seismic processing and interpretation that two (or more) seismic cubes are defined on the same geographic zone. Depending on the operational context, the analysis of the differences between the two cubes is generally instructive. It may display differences associated with:
- hydrocarbon production over time (4D, i.e. defined in the three spatial dimensions and one temporal dimension, reservoir problem);
- different variable types studied such as in a 4D problem in which two types of seismic waves are propagated in the subsurface: compression waves P and shearing waves S so as to produce two cubes, one P amplitude cube and one S amplitude cube;
- different processing parameters.

The characterisation of these differences (location, quantification) is never easy, as the mere difference between the two seismic cubes often proves to be insufficient, or even futile. In fact, even slight geographic shifts in the related coherent events on each of the two seismic cubes decrease the value of the information from the difference cube considerably.

OBJECT OF THE INVENTION

With a view to minimising these drawbacks, the invention proposes to provide a tool to assist with the determination of coherent events in a seismic image associating with each pixel of the image a pair of indices EII "Event Importance Index", ECI "Event Confidence Index" calculated by applying, on "overlapping windows", a hierarchical segmentation.

The term "overlapping window" refers to, instead of performing a segmentation on the entire image as is generally the case, performing successive segmentations on parts of the image defined by a "sliding window" which moves on the image similarly to a scanner.

The calculation of the EII and ECI pair of indices solves the problem of determining the coherent events of a seismic image in real time.

SUMMARY OF THE INVENTION

Advantageously, the coherent events of a seismic image are determined by means of the method according to the invention which comprises the following operating phases:
  a selection phase:
    of a segmentation criterion which is a function of a variable represented in the form of a seismic image such as the amplitude, contrast, gradient,
    of a zone of the image to be qualified, of at least one sliding window on said zone and its characteristics, a hierarchical segmentation phase, for overlapping sliding window positions, comprising a segmentation of said zone into n regions and for each pixel referenced at least once by a segmentation boundary:

the saving of the number of times for which the pixel is referenced by a segmentation boundary for each sliding window to which it belongs and the calculation of the ratio of this number by the maximum theoretical number of times that said pixel could be referenced, said ratio corresponding to the index ECI;

the attribution for each segmentation boundary of a hierarchical level based on a calculation which is a function of a determined criterion such as the surface area of the boundary, so as to obtain the index EIf;

an attribution phase to the non-referenced pixels of an index value EI and EIC corresponding to a numeric or alphanumeric characteristic non-value.

a phase for the determination of the coherent events of the image by thresholding the indices EII and ECI, i.e. by only selecting the referenced pixels of the zone corresponding to values less than or greater than a fixed threshold.

The variable may be a seismic attribute such as the amplitude, reflectivity, impedance or any other attribute calculated on a seismic cube.

This threshold could depend in particular on the business application pursued.

The characteristics of the sliding window may comprise its dimensions, the overlapping rate of a position i of the window with respect to a position i-r, the overlapping rate being defined by 1/r, where r is the modulus of the displacement vector in one of the main directions of the seismic image that is a multiple of a grid interval (definition an image is defined on a grid where the parameter is the grid interval in each of the main directions of the image (generally Euclidian axes)) in this direction.

The number n of segmentation regions of the zone may be dependent on the segmented zone.

The segmentation boundaries for each position of the sliding window define pixels referenced by the segmentation process and for which the indices EII and ECI may be calculated, where low EII and high ECI pixels define the most coherent events of the image.

Advantageously, the segmentation phase may be performed:

by the hierarchical "Water Shed" segmentation algorithm; this consists of a mathematical morphology algorithm used to perform hierarchical image segmentation;

on a previously filtered seismic image, i.e. an image converted by a filter, e.g. a filter used to improve the continuity of the image and eliminate high-frequency random noise The overlapping of the positions of the sliding window may be defined by an overlapping rate parameters expressed for example in pixels.

The value of this overlapping rate parameter may be reduced to reduce calculation times.

Naturally, in this case, the quality of the results should not be degraded.

This approach, in accordance with the method according to the invention, may be implemented within the scope of any operational context involving a seismic cube or seismic cubes from the same geographic zone.

The pixels referenced by the segmentation process of the guide zone surrounding the pointed horizon and characterised by their indices EII and EIC may enable the preparation of horizon qualification attribute maps so as to make it possible to perform quality control of said horizon.

BRIEF DESCRIPTION OF THE DRAWINGS

Embodiments of the invention will be described below, as non-limitative examples, with reference to the appended figures wherein:

FIG. 4 is a representation of the displacement of the window in FIG. 3;

DESCRIPTION OF THE PREFERRED EMBODIMENTS

The first example is illustrated in FIGS. 1 to 8b.

Figure 2A:
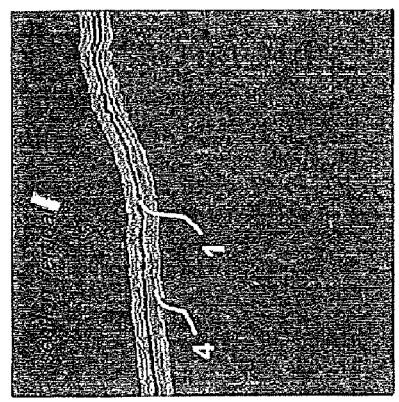
FIGS. 2a and 2b are vertical cross-sections of FIG. 1 representing the horizon to be qualified and the horizon to be qualified surrounded by a guide zone.
Figure 1:
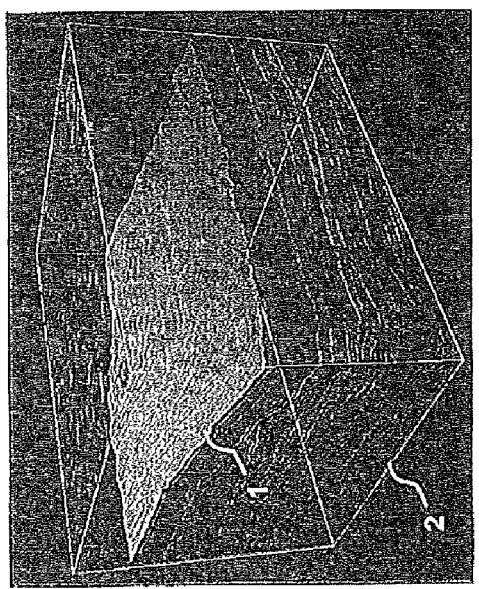
FIG. 1 is a perspective representation of a seismic cube and a horizon to be qualified.
Figure 3:
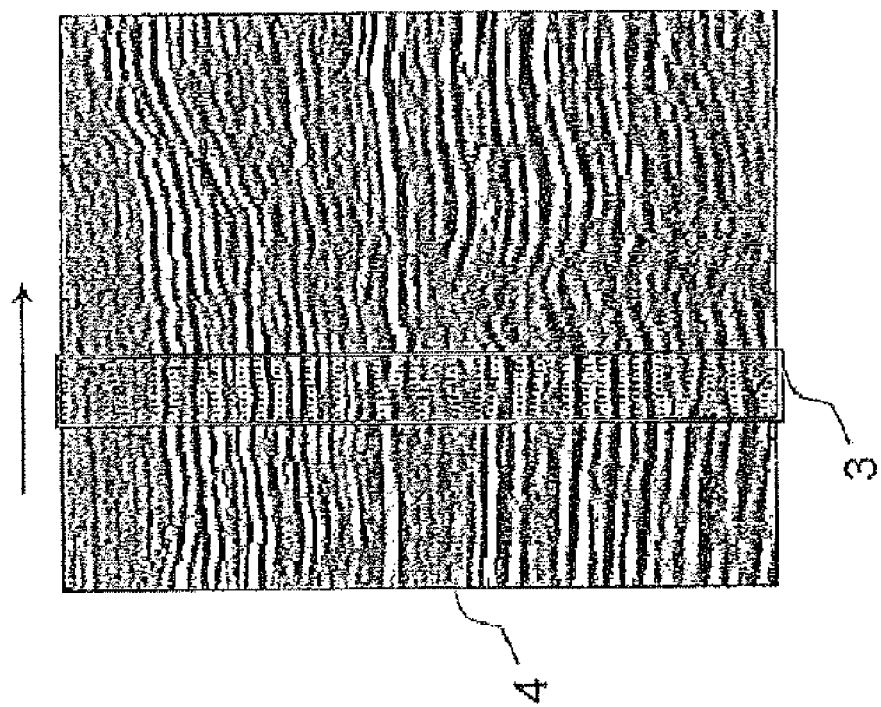
FIG. 3 is a representation of a cross-section of the guide zone comprising a sliding window.

This example relates to the quality control of a pointer of "horizons" (coherent events corresponding to geological interfaces) and in particular of an pointed horizon 1 on a seismic cube 2 (FIGS. 1 and 2a).

A horizon is extended broadly in space and represents a geological sedimentation interface between geological layers, it generally results from an interpretation by a geophysicist or a geologist.

The determination of the indices EII and ECI, in accordance with the method according to the invention, helps define the parts of the horizons considered anomalous that should be examined to ensure geological coherence of the pointed horizons.

The seismic variable or attribute used is the cube amplitude.

The first steps of the method comprise the selection:
of a hierarchical segmentation criterion of the variable such as the amplitude,
of a seismic cube zone comprising the pointed horizon to be qualified, i.e. on which quality control is to be performed,
a sliding window 3 on said zone and its characteristics (dimensions, overlapping rate, etc.) (FIG. 3), The selected hierarchical segmentation criterion is the amplitude corresponding to the values of the variable itself, i.e. one dynamic criterion associated with the values of the variable is taken. In this way, for example, the greater the mean value of the variable associated with a segmentation boundary, the more the pixels associated with this boundary will be found in the first hierarchy levels.

Figure 2B:
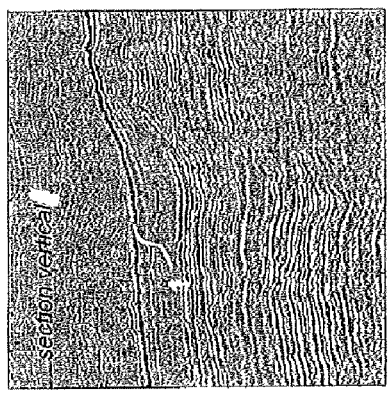

The seismic cube zone to be qualified is limited spatially in a guide zone 4 of the seismic cube 2 comprising and surrounding the pointed horizon to be qualified 1 (FIG. 2b).

This zone 4 serves as a mask to select the pixels of the seismic cubes on which the following steps of the process according to the invention will be performed. The width of the zone 4 is defined along a vertical cross-section (FIG. 2b) of the seismic cube by a vertical deviation parameter in pixels on either end of the pointed horizon 1.

It should be noted that the dimensions of the guide surrounding the horizon may be varied spatially.

The dimensions of the sliding window must be fixed.

For this, a preliminary geostatistical analysis may advantageously be performed to define objective criteria to assist with the selection of the sliding window dimensions. These criteria may comprise the spatial correlation lengths, for example, determined by means of the identification of the ranges of a variogram. The variogram is a statistical function used to analyse the spatial correlations within a set of spatial data, the ranges observed on the variogram providing the mean dimensions of the structures (events) in an image.

If required, the value of the overlapping rate parameter of the various positions of the sliding window 3 may be reduced to reduce the calculation times.

Naturally, this value will be selected so as not to degrade the quality of the results.

In FIG. 4, said overlapping rate is selected to be equal to one pixel and a fixed reference R is positioned. The position 6 of the window is offset by one pixel to the right with respect to the position 5 of the window and the position 7 of the window is offset by one pixel to the right with respect to the position 6 of the window The referenced pixels are presented by points P.

Once the segmentation criterion has been selected, the dimensions of the sliding window and its overlapping rate fixed and the guide zone 4 defined, all the pixels of the seismic cube of the guide zone are segmented by the sliding window.

In this example, the hierarchical segmentation phase, for overlapping sliding window positions, comprises the segmentation of the image into thirty regions and for the pixels referenced at least once by a segmentation boundary:

the saving of the number of times for which the pixel is referenced by a segmentation boundary for the sliding window to which it belongs and the calculation of the ratio of this number by the maximum theoretical number of times that said pixel could be referenced, said ratio corresponding to the index ECI (FIG. 4);

the attribution for each segmentation boundary of a hierarchical level according to a scale B based on a calculation which is a function of a determined criterion such as the surface area of the boundary, so as to obtain the index EII (FIG. 6), where the various levels may be represented by colours.

It should be noted that the number of segmentation regions varies from one sliding window to another. In fact, for example, if a sliding window is positioned on France, the segmentation will show 22 regions, which will not be the case for a sliding window on Germany.

Figure 5C:
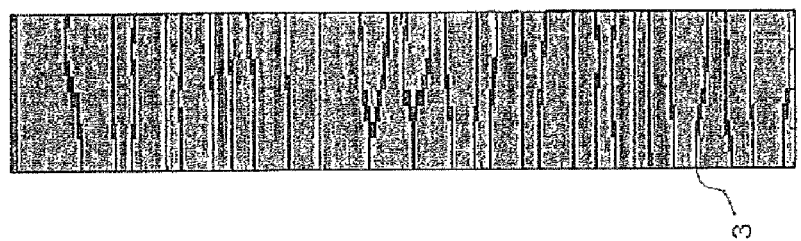
FIGS. 5a, 5b and 5c are representations of sliding window segmented into two, three or thirty regions respectively.
Figure 5B:
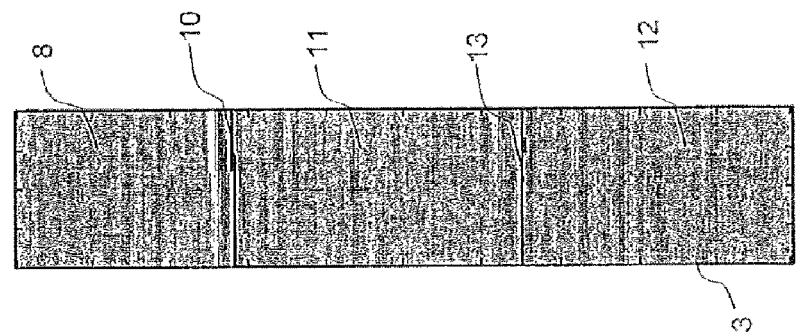
Figure 5A:
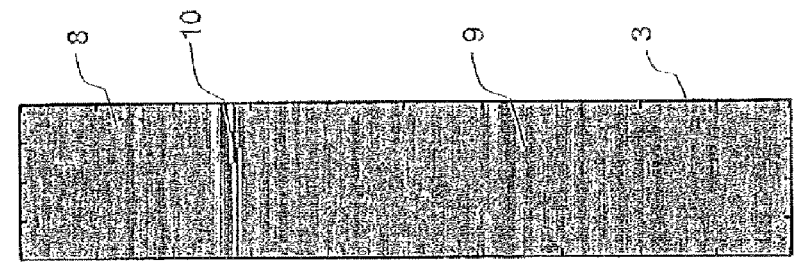

More specifically, when the image is segmented into two regions 8, 9, a boundary 10 appears (FIG. 5a). This boundary corresponds to the first hierarchy level and its value is set to one.

The image is then segmented into three regions 8, 11, 12, a boundary 13 appears (FIG. 5b). This boundary corresponds to the second hierarchy level and its value is set to two.

Figure 6:
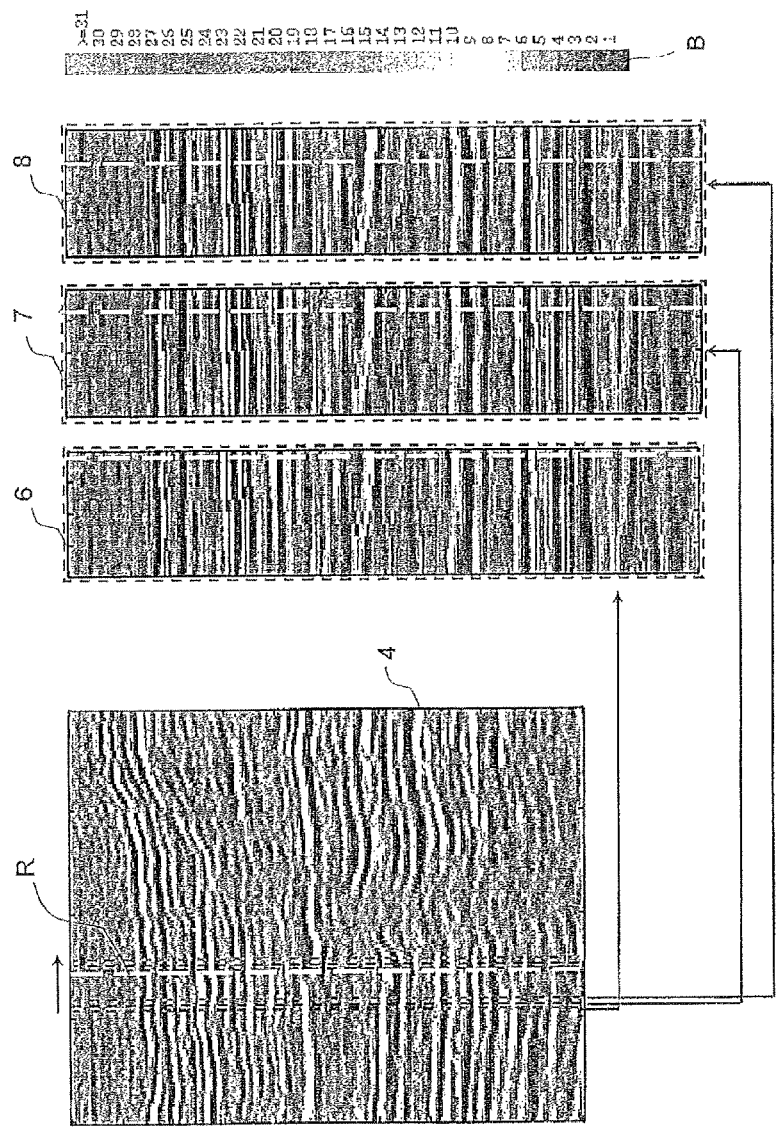
FIG. 6 is a representation of the displacement of the window in FIG. 3 displaying the boundaries according to the hierarchy.

The segmentation continues in this way until thirty regions and the corresponding boundaries are obtained (FIGS. 5c and 6).

The method then comprises the following steps:

an attribution phase to the non-referenced pixels of an index value EI and EIC corresponding to a numeric or alphanumeric characteristic non-value.

the determination of the coherent events of the zone by thresholding the indices EII and ECI, where the index EII should be less than a threshold value and the index ECI should be less than a threshold value, As all the pixels referenced by the segmentation process of the guide zone surrounding the pointed horizon are characterised by their indices EII and EIC, several qualification attribute maps of the pointed horizon may be calculated in order to enable the quality control of the horizon. In this zone, a pixel is defined by three dimensions x, y and z.

A qualification attribute map is a representation in two dimensions x and y. An attribute defined by a pair of x and y coordinates may correspond to a mean value for each vertical line (line centred along the seismic cube vertical axis z of depth) for all the referenced pixels of the guide zone surrounding the horizon (for example, mean ECI or EII per vertical line) or to the selection of a pixel on the vertical line, for example, that with the highest ECI or lowest EII and to a value associated with this pixel.

Figure 7C:
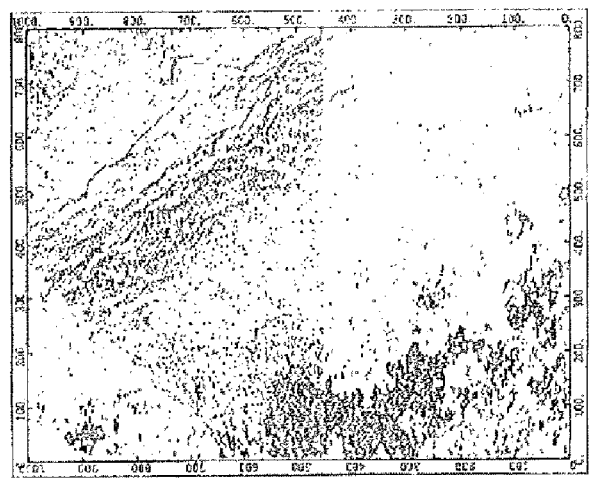
FIGS. 7a, 7b and 7c are representations of qualification attribute maps.
Figure 7B:
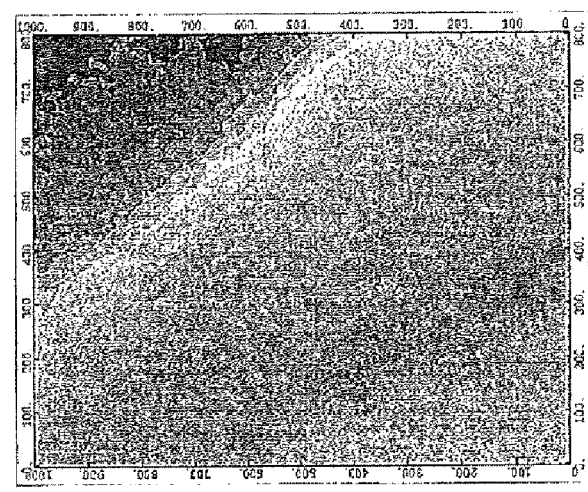
Figure 7A:
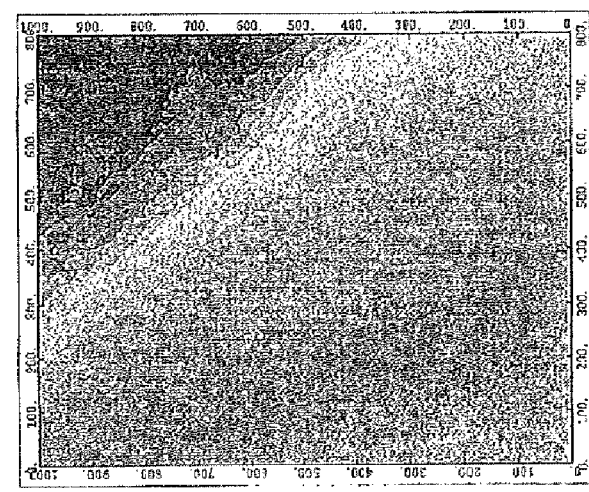

FIG. 7a represents a map of the horizon to be qualified. A colour code represents the depth Z of the horizon.

FIG. 7b represents a position qualification map of the pixels selected because they belonged to the most coherent local event.

FIG. 7c is a qualification attribute map of the pointer of the horizon to be qualified, where this attribute is referred to as the coherence attribute LPE.

For each vertical line of the guide zone defined by a pair of x and y coordinates, the pixel belonging to the most coherent local event was selected as being the pixel with the lowest EII and the highest ECI The difference between the vertical position of the pointed horizon and the vertical position of the selected pixels makes it possible to detect position anomalies of the pointed horizon.

Figure 8B:
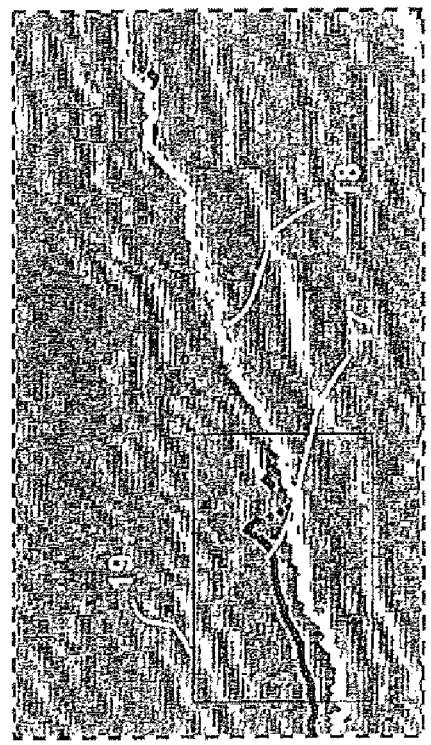
FIGS. 8a and 8b are representations on vertical cross-sections of anomalies, of deviations with respect to a local extremum and a phase jump from the horizon, displayed by means of the qualification attribute maps according to FIGS. 7a, 7b and 7c.

These maps make it possible to detect anomalies and reference them in the XY plane. These anomalies may then be found, on the basis of the interpretation of the anomalies on the 2D qualification maps, on the data cube, in a cross-section for example as illustrated in FIGS. 8a and 8b.

Moreover, in the specific case of the coherence attribute LPE, this attribute may also be represented in the cube.

These anomalies may consist, for a given pixel, of a deviation with respect to the local extremum i.e. a deviation between the most coherent event, i.e. the reference pixel and the pointed horizon which is greater than the maximum deviation permitted or less than the minimum deviation permitted.

Figure 8A:
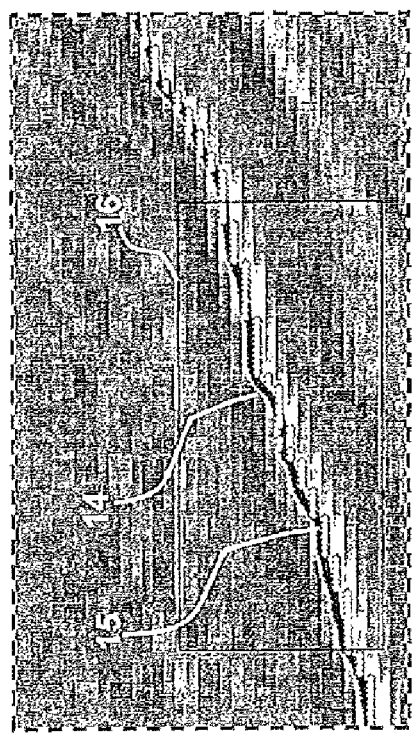

In the example in FIG. 8a, the pointed horizon is represented by a black line 14 and the qualified referenced pixels, i.e. the pixels with the highest ECI and the lowest EII, are represented by white circles 15. The box 16 contains a portion of pointed horizon located higher than the referenced pixel formed in this way.

These anomalies may also consist of horizon phase jumps corresponding to pointer errors which represent the unauthorised switch from one horizon to another or from one event to another:

In the example in FIG. 8b, the pointed horizon is represented by a black line 17 and the qualified referenced pixels, i.e. the pixels with the highest ECI and lowest EII, are represented by a white line 18. The box 19 contains a phase jump of the pointed horizon.

A second example relates to the determination of coherent events on different seismic cubes in the same geographic zone, where these are generated with different processing parameters.

In fact, in the solutions proposed at the present time, it is a frequent occurrence in seismic processing and interpretation that two or more seismic cubes are defined on the same geographic zone. Depending on the operational context, the analysis of the differences between the two cubes is generally instructive in this case. It may display differences associated with:

- hydrocarbon production over time (4D reservoir problem);
- different types of variable studied (4C problem for example);
- different processing parameters.

However, the characterisation of these differences (location, quantification) is never easy, as the mere difference between the two seismic cubes often proves to be insufficient, or even futile. In fact, even slight geographic shifts in the related coherent events on each of the two seismic cubes decrease the value of the information from the difference cube considerably. In this way, the mere difference between the two seismic cubes does not make it possible to make the distinction between differences associated, on one hand, with geographic shifts of coherent seismic events and, on the other, energy variations (in terms of value) of these events.

However, the quantification of the impact of the processing parameters on the images in terms of seismic cube amplitude is vital in a reservoir-oriented oil survey, where this impact eventually influences the hydrocarbon reserve calculation.

The determination of the indices EII and ECI on each of the two cubes of the same geographic zone, in accordance with the method according to the invention, makes it possible to eliminate spatial geographic shifts of coherent events of the same geological origin and thus enable the implementation of additional quantitative tools to analyse the differences between seismic cubes in the same geographic zone.

The method then comprises the following steps:
  the determination, for each seismic cube, of the indices EII and ECI in accordance with the method according to the invention developed in example 1 by selecting:
    the amplitude of the "seismic amplitude" variable as the segmentation criterion,
    the dimensions of the sliding window such that, the more small coherent events are to be selected, the more restricted the dimensions of the sliding window are,
    a high threshold value to perform thresholding on the index ECI (selection of high ECI values) and the index EII (selection of high EII values) in order to determine a high number of coherent events on both seismic cubes.
  once the coherent events have been identified on each of the seismic cubes, pairing of these events consisting of defining that a given geological event is referenced on each of the two cubes and corresponds to given seismic events on the cubes; paired in this way, these events are used as material for the calculation of characterisation attributes of the differences in the seismic cubes.

The pairing criterion may for example be a spatial proximity criterion: two "sufficiently" close events, i.e. belonging to a common vicinity are considered as corresponding to the same geological event.

According to one alternative embodiment, the segmentation results of one of the seismic cubes may be used to perform the segmentation of the other cube subject to constraint. In particular, the Water Shed makes it possible to construct markers for the segmentation of a seismic cube, these markers being obtained on the basis of the segmentation results of the other cube.

According to another alternative embodiment, the sliding window overlapping rate may be reduced to reduce the calculation times such that the quality of the results is not degraded.

The pairing of the coherent events of each of the two images may be performed by searching, with some vertical tolerance, the most similar pixels defining coherent events of one of the two seismic images to the pixels defining the coherent events of the other seismic image.

The selection of the paired coherent events makes it possible to eliminate the geographic shift effects of the coherent events and, as a result, characterise the differences between seismic cubes better by calculating, for example, the mere difference in the values, the geographic shift of the coherent events on each of the two cubes or any other relevant attribute.

This approach, in accordance with the method according to the invention, may be implemented within the scope of any operational context involved different seismic cubes but from the same geographic zone (4D, 4C, multi-3D, etc.).

The invention claimed is:

1. Method to determine coherent events of a seismic image, using a computer to perform the steps of:
  selecting:
    a segmentation criterion which is a function of a variable represented in the form of a seismic image such as the amplitude, contrast, gradient of a zone of the image to be qualified,
    at least one sliding window on said zone and its characteristics, said characteristics comprising at least one of dimensions and overlapping rate,
  hierarchically segmenting, for overlapping sliding window positions, said zone into n regions and for each pixel referenced at least once by a segmentation boundary:
    saving of the number of times for which the pixel is referenced by a segmentation boundary for each sliding window to which it belongs and calculating the ratio of said number by the maximum theoretical number of times that said pixel could be referenced, said ratio corresponding to an index ECI;
    attributing, for each segmentation boundary a hierarchical level based on a calculation which is a function of a determined criterion comprising a surface area of the boundary, so as to obtain an index EII;
  attributing to the non-referenced pixels, and an index value EI and EIC corresponding to a numeric or alphanumeric characteristic non-value; and
  determining coherent events of the image by thresholding the indices EII and ECI, said thresholding comprising only selecting the referenced pixels of the zone corresponding to values less than or greater than a fixed threshold.

2. Method according to claim 1, wherein the variable is a seismic attribute comprising at least one of amplitude, reflectivity, and impedance.

3. Method according to claim 1, wherein the characteristics of the sliding window comprise at least one of dimensions of the sliding window and an overlapping rate of a position i of the window with respect to a position i-r, the overlapping rate being defined by 1/r, where r is the modulus of the displacement vector in one of the main directions of the seismic image that is a multiple of a grid interval in this direction.

4. Method according to claim 1, wherein the number n of segmentation regions of the zone is dependent on the segmented zone.

5. Method according claim 1, wherein the second phase is performed by a hierarchical segmentation algorithm.

6. Method according to the claim 1, wherein the second phase is performed on a previously filtered seismic image comprising an image covered by a filter.

7. Method according to claim 6, wherein said filter improves continuity of the image and eliminates high frequency random noise.

8. Method according to claim 1, wherein the overlap of the sliding windows is defined by an overlapping rate parameter expressed in pixels.

9. A method for controlling the quality of a horizon pointer on a seismic cube using the method of determining coherent events of a seismic image according to claim 1.

10. A method for determination of coherent events on different seismic cubes from the same geographic zone, where said cubes are generated with different processing parameters using the method of determining coherent events of a seismic image according to claim 1.

\* \* \* \* \*